United States Patent [19]

Byrnes et al.

[11] Patent Number: 5,242,267

[45] Date of Patent: Sep. 7, 1993

[54] BEARINGLESS MAIN ROTOR ASSEMBLY TORQUE TUBE

[75] Inventors: Francis E. Byrnes, White Plains, N.Y.; I. Lawrence Cullen, III, North Haven, Conn.

[73] Assignee: United Technologies Corporation, Hartford, Conn.

[21] Appl. No.: 1,943

[22] Filed: Jan. 8, 1993

Related U.S. Application Data

[63] Continuation of Ser. No. 751,272, Aug. 28, 1991, abandoned.

[51] Int. Cl.⁵ .............................................. B64C 27/32
[52] U.S. Cl. .................................... 416/134 A; 416/230
[58] Field of Search ................... 416/134 A, 140, 141, 416/230; 156/169, 171, 173, 175, 286

[56] References Cited

U.S. PATENT DOCUMENTS

| | | | |
|---|---|---|---|
| 4,292,009 | 9/1981 | Weiland et al. | 416/134 A |
| 4,381,902 | 5/1983 | Head et al. | 416/134 A |
| 4,568,246 | 2/1986 | Hibyan et al. | 416/134 A |
| 4,676,720 | 6/1987 | Niwa et al. | 416/134 A |
| 4,676,853 | 6/1987 | Lerma | 156/87 |
| 4,963,215 | 10/1990 | Ayers | 156/286 |
| 5,059,094 | 10/1991 | Robinson et al. | 416/134 A |

Primary Examiner—Edward K. Look
Assistant Examiner—James A. Larson
Attorney, Agent, or Firm—Terrance J. Radke

[57] ABSTRACT

A composite torque tube for a bearingless main rotor (BMR) assembly that is optimally fabricated to meet torsional stiffness, fatigue strength, and buckling strength design constraints at minimal unit weight. The composite torque tube includes a strengthened inboard section for mechanically coupling the torque tube in combination with the hub structure of the BMR assembly, a strengthened outboard section for mechanically coupling the torque tube in combination with a corresponding main rotor blade, and an intermediate section that is operative to accommodate the pitch, flapwise, and/or edgewise loads acting on the BMR assembly during operation thereof. The intermediate section of the torque tube has a constant wall thickness and is formed from continuous filament windings having a predetermined fiber orientation within a broad range of about $+/-18°$ to about $+/-40°$ and/or a narrow range of about $+/-26°$ to about $+/-35°$. The torque tube is preferably formed from continuous filament windings having an optimal fiber orientation of about $+/-35°$ to provide an intermediate section having a minimal torque tube wall thickness.

9 Claims, 5 Drawing Sheets

BEARINGLESS MAIN ROTOR ASSEMBLY TORQUE TUBE

This is a continuation of application Ser. No. 07/751,272, filed Aug. 28, 1991, abandoned.

RELATED APPLICATION

The present application is related to commonly-owned, co-pending U.S. patent application Ser. No. 07/749,739, filed Aug. 26, 1991, entitled MID-BEAM JOINTED RECONFIGURABLE BEARINGLESS MAIN ROTOR ASSEMBLY (S-4324).

TECHNICAL FIELD

The present invention relates to bearingless main rotor assemblies for helicopters, and more particularly, to a composite torque tube for a bearingless main rotor assembly that is optimally fabricated to provide the requisite torsional stiffness, fatigue strength, and buckling strength at minimal unit weight.

BACKGROUND OF THE INVENTION

A helicopter main rotor assembly is subjected to various aerodynamic, inertial, and centrifugal forces and moments during flight operations and to main rotor blade static droop when the helicopter powerplant is shut down. The main rotor assembly is designed to accommodate such forces and moments through the structural and functional characteristics of the various structural elements comprising the main rotor assembly. Of particular concern in designing a helicopter main rotor assembly are centrifugal loading (due to rotation of the rotor blades), torsional loading (due to pilot pitch control inputs), flapwise loading (due to out-of-plane blade motions, i.e., flapping), and edgewise or chordwise loading (due to in-plane blade motions, i.e., lead or lag).

Many prior art main rotor assemblies (older helicopters or those at the lower end of the cost spectrum) utilize mechanical mechanisms to react centrifugal, pitch, flapping, and/or lead-lag loads developed in the main rotor assembly. Blade attachment bolts have been utilized to transfer centrifugal loads from the main rotor blades to the main rotor hub structure. Bearings in the form of rolling element or elastomeric bearings have been utilized in mechanical hinges to react the pitch, flapping and lead-lag motions experienced by the main rotor blades. Mechanical linkages have been utilized to input pilot pitch changes to the main rotor blades.

Design and development efforts vis-a-vis main rotor assemblies have been directed to optimizing the functional characteristics thereof while concomitantly reducing weight and complexity to enhance the overall operational efficacy. The increased reliability, adaptability, reproducibility, and flexibility available from composite structures, due to advancements in composite materials and/or fabrication techniques, has led to the increased use of composite materials in helicopter main rotor assemblies. Individual composite structural elements may be designed and fabricated for main rotor assemblies to react a plurality of the main rotor assembly loading effects described hereinabove, thereby reducing the number of mechanical mechanisms required in the main rotor assembly to react centrifugal, pitch, flapwise, and/or chordwise loads and providing a concomitant reduction in the overall weight and complexity of the main rotor assembly.

The elimination of the offset flapping and lead-lag hinges in main rotor assemblies through the use of composite structural members has resulted in "bearingless" main rotor assemblies. The composite structural members of a bearingless main rotor assembly may be described as "flexbeams" or "crossbeams" due to the structural and/or functional characteristics of such composite structural members.

An exemplary composite crossbeam of a bearingless main rotor assembly is described in U.S. Pat. No. 4,746,272. The integral composite crossbeam described in the '272 patent is designed and fabricated to segregate the flapwise shear strain from the torsional shear strain to improve the fatigue performance of the crossbeam. An inboard flexure portion of each leg of the integral crossbeam is comprised of unidirectional composite fibers overwound or wrapped with a ±45° composite wrap that forces torsional deflections outboard of the inboard flexure portion. The inboard flexure portion, therefore, reacts flapwise loads while an outboard flexure portion of each leg of the integral crossbeam reacts chordwise and torsion loads. The composite crossbeam provides an integral mechanical interface between opposed main rotor blades which accommodates centrifugal loading experienced by the opposed main rotor blades.

While much effort has been expended to optimize the structural and functional characteristics of composite flexbeams and crossbeams to enhance the overall efficacy of the main rotor assembly, minimal design and developmental work has been directed to optimizing the structural and functional characteristics of the main rotor assembly torque tube with respect to weight. What design and development work that has been done with respect to composite torque tubes has been driven primarily by the torsional stiffness requirements of the torque tube.

A torque tube is a hollow, elongated structural member that envelopes the main rotor assembly flexbeam or crossbeam and is connected at respective ends to the flexbeam (or crossbeam) and a main rotor blade. Each torque tube is operative to couple pilot-commanded pitch changes transmitted through a pitch input control device at the flexbeam end of the torque tube to the corresponding main rotor blade. This functional capability requires that torque tubes possess a certain torsional stiffness.

In addition to being designed and fabricated with a certain torsional stiffness to accommodate and react to pitch loading, torque tubes must also be designed and fabricated for fatigue strength and buckling strength to accommodate and react to flapwise and chordwise loading. The torque tubes must have sufficient fatigue strength to withstand the cyclic flapwise and chordwise loading experienced during normal main rotor assembly operations. Similarly, the torque tubes must have sufficient buckling strength to withstand the flapwise bending loads experienced during main rotor assembly startup which tend to induce buckling in the ventral and dorsal surfaces of the torque tube.

Prior art composite torque tubes have a structural configuration that includes an intermediate region having a constant wall thickness that provides the torsional stiffness and accommodates flapwise and chordwise bending loads, and thickened end regions that accommodate the coupling connections described hereinabove. Such prior art torque tubes have typically been formed with a ±45° fiber matrix orientation (with respect to the main rotor blade pitch axis) to provide maximum torsional stiffness. While the ±45° fiber matrix orientation satisfies the torsional stiffness requirements of the torque tube, this fiber matrix orientation is not optimal in providing a torque tube configuration that meets the torsional stiffness, buckling strength, and fatigue strength design requirements at minimal unit weight, i.e., the torque tube is overdesigned. The ±45° fiber matrix orientation incurs a weight penalty in providing a greater than necessary wall thickness in the intermediate region.

There exists a need to provide a composite torque tube that is optimally fabricated to meet torsional stiffness, buckling strength, and fatigue strength design constraints at minimal unit weight. The optimally fabricated composite torque tube should also have a structural configuration that accommodates the loads and stresses experienced at the connection ends of the torque tube. Moreover, the fabrication technique for the composite torque tube should be consonant with the present level of composite materials manufacturing technology.

SUMMARY OF THE INVENTION

One object of the present invention is to provide a helicopter main rotor assembly composite torque tube that is optimally fabricated to meet torsional stiffness and strength design constraints at minimal unit weight.

Another object of the present invention is to provide a composite torque tube having an intermediate section optimally fabricated to meet torsional stiffness, fatigue strength, and buckling strength design constraints with a minimal wall thickness.

A further object of the present invention is the fabrication of a composite torque tube that includes an intermediate section formed from continuous filament windings having an optimal fiber orientation that meets torsional stiffness, fatigue strength, and buckling strength design constraints with a minimal wall thickness.

Yet another object of the present invention is the fabrication of a composite torque tube that includes an intermediate section formed from continuous filament windings having a predetermined fiber orientation within the range of ±18° to ±40° and/or within the range of about ±26° to about ±35°.

Still one more object of the present invention is the fabrication of a composite torque tube that includes an intermediate section formed from continuous filament windings having a predetermined fiber orientation within the range of ±26° to about ±35°.

Still another object of the present invention is the fabrication of a composite torque tube that includes an intermediate section formed from continuous filament windings having an optimal fiber orientation of about ±35°.

These and other objects are achieved by a bearingless main rotor (BMR) torque tube according to the present invention that is an element of a bearingless main rotor assembly that comprises a hub structure having integral flexbeams, torsion flexure members and main rotor blades disposed in combination with the integral flexbeams, snubber dampers, an upper clamp plate, a lower hub plate, a swashplate subassembly, pitch control rods, and a static rotor mast. The BMR torque tube is a hollow, elongated, tapered composite structural member formed by continuous filament windings, fibrous wraps, and fibrous laminates of a fibrous material such as graphite that is impregnated with epoxy resin and cured to form the composite structure. The structural configuration of the composite BMR torque tube includes an inboard section, an intermediate section, and an outboard section. The inboard section may be further described as including a snubber subsection and an inboard transition subsection. The outboard section may be further described as including an outboard continuation subsection and a blade connection subsection.

Each BMR torque tube is rigidly connected to a respective torsion flexure member, main rotor blade combination by means of bolted connections extending through the blade connection subsection and the torsion flexure member. The snubber subsection is configured for articulately connecting the BMR torque tube in combination with the upper and lower snubber dampers.

The blade connection subsection is optimally fabricated to react loads through the bolted connection of the BMR torque tube to the torsion flexure member, main rotor blade combination. The blade connection section includes fibrous laminates having a 0° fiber orientation for accommodating the loads acting through the bolted connections. In addition, the blade connection subsection includes fibrous laminates/wraps having a ±45° fiber orientation which are advantageous in accommodating load transfers between the BMR torque tube and the integral flexbeams.

The snubber subsection is optimally fabricated to react hoop stresses induced by the snubber damper connections. The snubber subsection includes wrapped filaments having a 90° fiber orientation for accommodating the induced hoop stresses. The snubber subsection also includes fibrous laminates/wraps having a ±45° fiber orientation for accommodating bearing loads arising from the snubber dampers and pitch control rod.

The intermediate section of the composite BMR torque tube of the present invention is optimally fabricated to meet the torsional stiffness, fatigue strength, and buckling strength requirements of the BMR assembly, that is, to accommodate the pitch, flapwise, and/or edgewise loads acting on the BMR torque tube during operation of the BMR assembly. The optimal fiber orientation for the continuous filament windings comprising the intermediate section of the BMR torque tube was determined by a parametric analysis of each of the torque tube design constraints, i.e., torsional stiffness, fatigue strength, and buckling strength, to determine the minimum torque tube wall thickness necessary to satisfy these design constraints.

In addition to these design constraints, other factors affect the selection of the fiber orientation (the "optimal" fiber orientation) for the intermediate section of the BMR torque tube according to the present invention. In particular, a snubber subsection that includes fibrous material having a ±45° fiber orientation is advantageous for accommodating bearing loads arising from the snubber damper connections and the pitch control rod.

Due to the spanwise cross-sectional shape distribution of the inboard section of the BMR torque tube, i.e., the tapered configuration, and the inherent variability of the winding angles provided by current composite winding fabrication equipment, the fiber orientation angle of continuous fiber windings transitioning from the intermediate section to the inboard section is not constant. Current fiber winding techniques result in a fiber orientation angle in the inboard section that is greater than the fiber orientation angle in the intermediate section.

The inventors have determined that a fiber orientation of about ±35° (the "optimal" fiber orientation) for the intermediate section of the BMR torque tube of the present invention counterbalances the factors described hereinabove. A continuous fiber winding having the optimal fiber orientation of about ±35° in the intermediate section can be smoothly transitioned utilizing current fiber winding techniques to provide a ±45° fiber orientation in the snubber subsection of the inboard section. Thus, the pragmatic effect of current fiber winding techniques is utilized to provide a beneficial fiber orientation in the inboard section that enhances the overall structural strength of the snubber subsection without necessitating the use of additional fibrous material having a ±45° fiber orientation. In addition, the optimal ±35° fiber orientation provides a significant savings in the overall weight of the BMR torque tube as compared to prior art torque tubes having a ±45° fiber orientation.

The utilization of the ±35° optimal fiber orientation for the continuous filaments forming the intermediate section results in a BMR torque tube having a minimal torque tube wall thickness that satisfies the torsional stiffness, fatigue strength, and buckling strength design constraints of the BMR assembly at minimal overall weight.

However, fiber orientations other than the optimal fiber orientation may be utilized to form the intermediate section of the BMR torque while providing a reduction in overall torque tube weight as compared to prior art torque tubes utilizing the ±45° fiber orientation. Fiber orientations within the broad range of about ±18° to about ±40° and within the narrower range of about ±26° to about ±35° are within the scope of the present invention.

The lay-up protocol for forming the composite structure of the BMR torque tube of the present invention includes the use of optimally orientated continuous filament windings over the entire span length of the torque tube, 90° filament windings in the inboard section, the application of fibrous wraps having ±45° fiber orientation in the inboard section, the application of fibrous wraps having ±45° fiber orientation in the outboard section, the application of fibrous laminates having a 0° fiber orientation to the ventral and dorsal surfaces of the outboard section, and the application of fibrous laminates having a ±45° fiber orientation to the ventral and dorsal surfaces of the outboard section. After each predetermined application sequence of filament windings, fibrous wraps, and/or fibrous laminates, the layed-up composite structure is nylon wrapped, covered with bleeder resin, vacuum bagged, and debulked for a predetermined period of time.

The optimally orientated continuous filaments are tension wound over the span length of the torque tube to provide a constant optimal fiber orientation in the intermediate and outboard sections and a transitioning fiber orientation in the transition subsection. The application of the filament windings and fibrous wraps/laminates of varying sizes results in a BMR torque tube according to the present invention that has constant torque tube wall thicknesses of different magnitude in the intermediate section and the snubber subsection, ventral and dorsal wall thicknesses of constant magnitude in the blade connection subsection, and inboard transition and outboard continuation subsections that have varying torque tube wall thicknesses in the spanwise direction.

A pitch control rod is attached to a corresponding BMR torque tube in a manner known in the art to provide efficient transfer of pitch inputs from the swashplate assembly to the respective main rotor blade by means of the BMR torque tube according to the present invention.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF PREFERRED EMBODIMENTS

Figure 1:
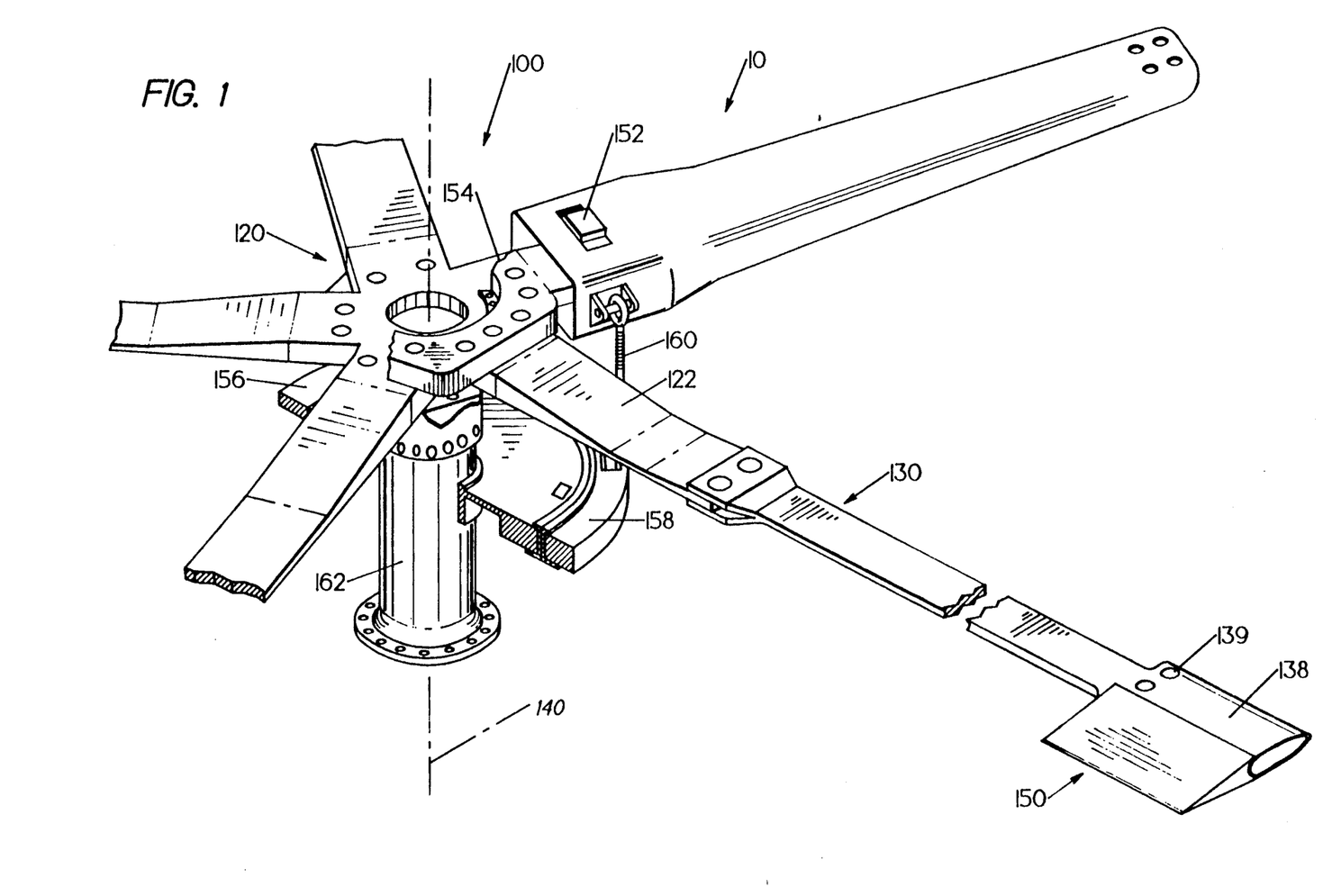
FIG. 1 is a partial, perspective view of a bearingless main rotor assembly.

Referring now to the drawings wherein like reference numerals identify corresponding or similar elements throughout the several views, FIG. 1 illustrates an embodiment of a bearingless main rotor (BMR) assembly 100. The embodiment illustrated is similar in structural and functional characteristics to the preliminary design configuration of the BMR assembly for the RAH-66 Comanche helicopter (not shown). It is a five-bladed bearingless main rotor assembly wherein bearings have been eliminated from centrifugal loadpaths and wherein blade flapwise and chordwise loads are reacted through out-of-plane and in-plane flexure of integral composite flexbeams. Torsional loads are accommodated by means of composite torsional flexure members that provide the interactive interface structure between the integral composite flexbeams and corresponding main rotor blades.

The BMR assembly 100 comprises a PENTAFLEX ™ (trademark of the Sikorsky Aircraft Division of United Technologies Corporation) hub structure 120 coaxially disposed with respect to the axis of rotation 140 of the BMR assembly 100 that includes a plurality of integral flexbeams 122, torsion flexure members 130 and main rotor blades 150 disposed in combination with the integral flexbeams 122 of the hub structure 120, bearingless main rotor (BMR) torque tubes 10 according to the present invention disposed in combination with respective flexbeams 122 and torsion flexure member 130, main rotor blade 150 combinations, snubber dampers 152 disposed in combination with the integral flexbeams 122 and the BMR torque tubes 10, an upper clamp plate 154, a lower hub plate 156, a swashplate 158 subassembly, pitch control rods 160, and a static rotor mast 162.

The structural and functional characteristics of the PENTAFLEX ™ hub structure 120, the integral flexbeams 122, the torsion flexure members 130, the main rotor blades 150, the upper clamp plate 154, the lower hub plate 156, and the static rotor mast 162 for the BMR assembly 100 embodiment of FIG. 1 are illustrated and described in further detail in commonly-owned, copending U.S. patent application Ser. No. 07/749,739, filed Aug. 26, 1991, entitled MID-BEAM JOINTED RECONFIGURABLE BEARINGLESS MAIN ROTOR ASSEMBLY (S-4324) which is incorporated herein by reference. Only those features of the BMR assembly 100 that directly interact with the BMR torque tube 10 of the present invention and that facilitate a more complete understanding thereof are described in the following paragraphs. Reference may be had to the above-described application for further details vis-a-vis the other elements of the BMR assembly 100.

The snubber dampers 152 are operative to maintain the flatwise position of the BMR torque tube 10 relative to the respective flexbeams 122 of the PENTAFLEX ™ hub structure 120. The snubber dampers 152 are also operative to provide lead-lag damping to ensure stability of the BMR assembly 100, and to accommodate a virtual pitch hinge. The inboard location of the snubber dampers 152 results in a smaller Delta 3 that minimizes pitch/flap coupling. With a large Delta 3, large flapwise loads cause pitch changes in the main rotor blades such that the main rotor assembly operation is sluggish, i.e., counteracts cyclic inputs.

Two snubber dampers 152 are utilized for each main rotor blade 150 of the BMR assembly 100, each snubber damper 152 being disposed intermediate corresponding surfaces of the respective flexbeam 122 and BMR torque tube 10. A representative example of the configuration, disposition, and function of a snubber damper for a helicopter main rotor assembly is illustrated and described in U.S. Pat. No. 4,244,677.

The swashplate subassembly 158 in combination with the pitch control rods 160 couples pitch input changes commanded by the pilot to the BMR torque tubes 10. The BMR torque tube 10 of the present invention is operative, due to its torsional stiffness, to efficiently transfer such pitch input changes to the respective main rotor blade 150.

Figure 2:
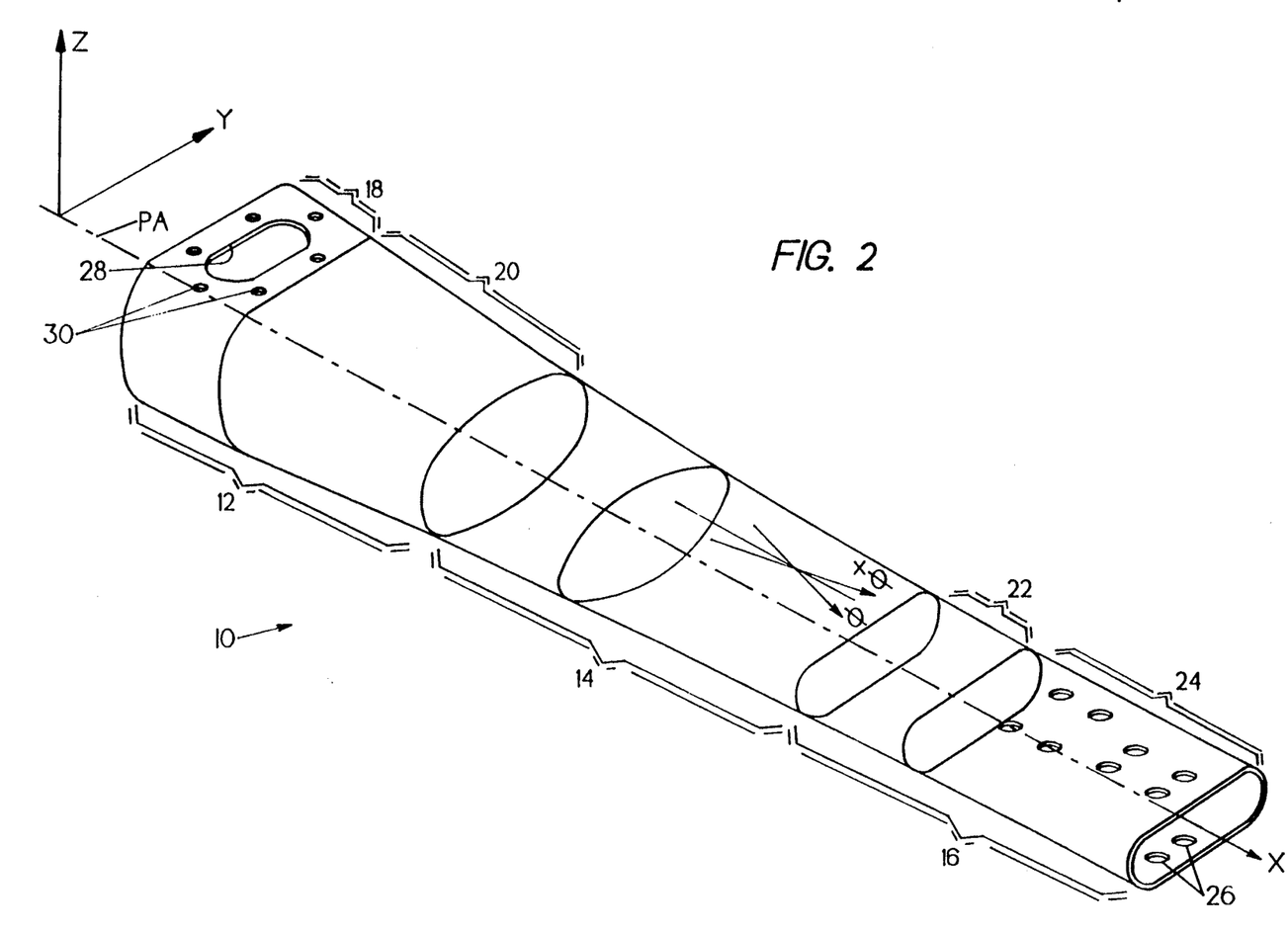
FIG. 2 is a perspective view of a bearingless main rotor assembly (BMR) torque tube according to the present invention.

One embodiment of a composite BMR torque tube 10 according to the present invention is schematically illustrated in FIG. 2. The illustrated BMR torque tube 10 is a hollow, elongated, tapered composite structural member formed by continuous filament windings, fibrous wraps, and fibrous laminates as described in further detail hereinbelow. The BMR torque tube 10 may be formed from fibrous materials such as C12/E7K8 and C12/5225 graphite filament windings, wraps, and laminates impregnated with epoxy resin and cured to form the composite structure. Other fibrous materials and resins having utility in the formation of composite BMR torque tubes 10 according to the present invention are generally known to those skilled in the art.

The structural configuration of the composite BMR torque tube 10 includes an inboard section 12, an intermediate section 14, and an outboard section 16. The inboard section 12 may be further described as including a snubber subsection 18 and an inboard transition subsection 20. The outboard section 16 may be further described as including an outboard continuation subsection 22 and a blade connection subsection 24. Also illustrated in FIG. 2 is the main rotor blade pitch axis PA (feathering axis) and an XYZ reference coordinate system (the blade pitch axis PA coincides with the X-axis). References hereinbelow to ventral and dorsal may be correlated with $+Z$, $-Z$, respectively.

The blade connection subsection 24 has aligned connection holes 26 formed in the ventral and dorsal portions of the torque tube wall. Each BMR torque tube 10 is rigidly connected to a respective torsion flexure member 130, main rotor blade 150 combination by means of bolted connections utilizing the connection holes 26 and corresponding bolt holes 139 of the torsion flexure member 130 (see FIG. 1). The snubber subsection 18 has aligned snubber apertures 28 and snubber connection holes 30 formed in the ventral and dorsal portions of the torque tube wall. The snubber apertures 28 and snubber connection holes 30 provide the means for articulately connecting the BMR torque tube 10 in combination with the upper and lower snubber dampers 152 as described hereinabove.

The blade connection subsection 24 is optimally fabricated to react loads through the bolted connection of the BMR torque tube 10 to the torsion flexure member 130, main rotor blade 150 combination. The blade connection section 24 includes fibrous laminates having a 0° fiber orientation (along the X axis) for accommodating the loads acting through the bolted connections. In addition, the blade connection subsection 24 includes fibrous laminates/wraps having a ±45° fiber orientation which are advantageous in accommodating load transfers between the BMR torque tube 10 and the integral flexbeams 122.

The snubber subsection 18 is optimally fabricated to react hoop stresses induced by the snubber damper 152 connections. The snubber subsection 18 includes wrapped filaments having a 90° fiber orientation (along the Y axis) for accommodating the induced hoop stresses. The snubber subsection 18 also includes fibrous laminates/wraps having a ±45° fiber orientation for accommodating bearing loads arising from the snubber dampers 152 and pitch control rod 160.

The intermediate section 14 of the composite BMR torque tube 10 of the present invention is optimally fabricated to meet the torsional stiffness, fatigue strength, and buckling strength requirements of the BMR assembly 100, that is, to accommodate the pitch, flapwise, and/or edgewise loads acting on the BMR torque tube 10 during operation of the BMR assembly 100. The optimal fiber orientation for the continuous filament windings comprising the intermediate section 14 of the BMR torque tube 10 was determined by parametric analysis. Each of the torque tube design constraints, i.e., torsional stiffness, fatigue strength, and buckling strength, was individually analyzed over a fiber orientation spectrum of 0° to 90° (with respect to the X-axis) to determine the minimum torque tube wall thickness (t) necessary to satisfy the specific design constraint. The parametric analysis was based upon the following criteria:

GJ > Design Requirement $\epsilon$ < material allowable $Nx_{cr} \leq Nx$ where GJ is the torsional stiffness, $\epsilon$ is the fatigue strain in the laminate, $Nx_{cr}$ is the critical buckling load in lb/in, and Nx is the buckling load.

Figure 3:
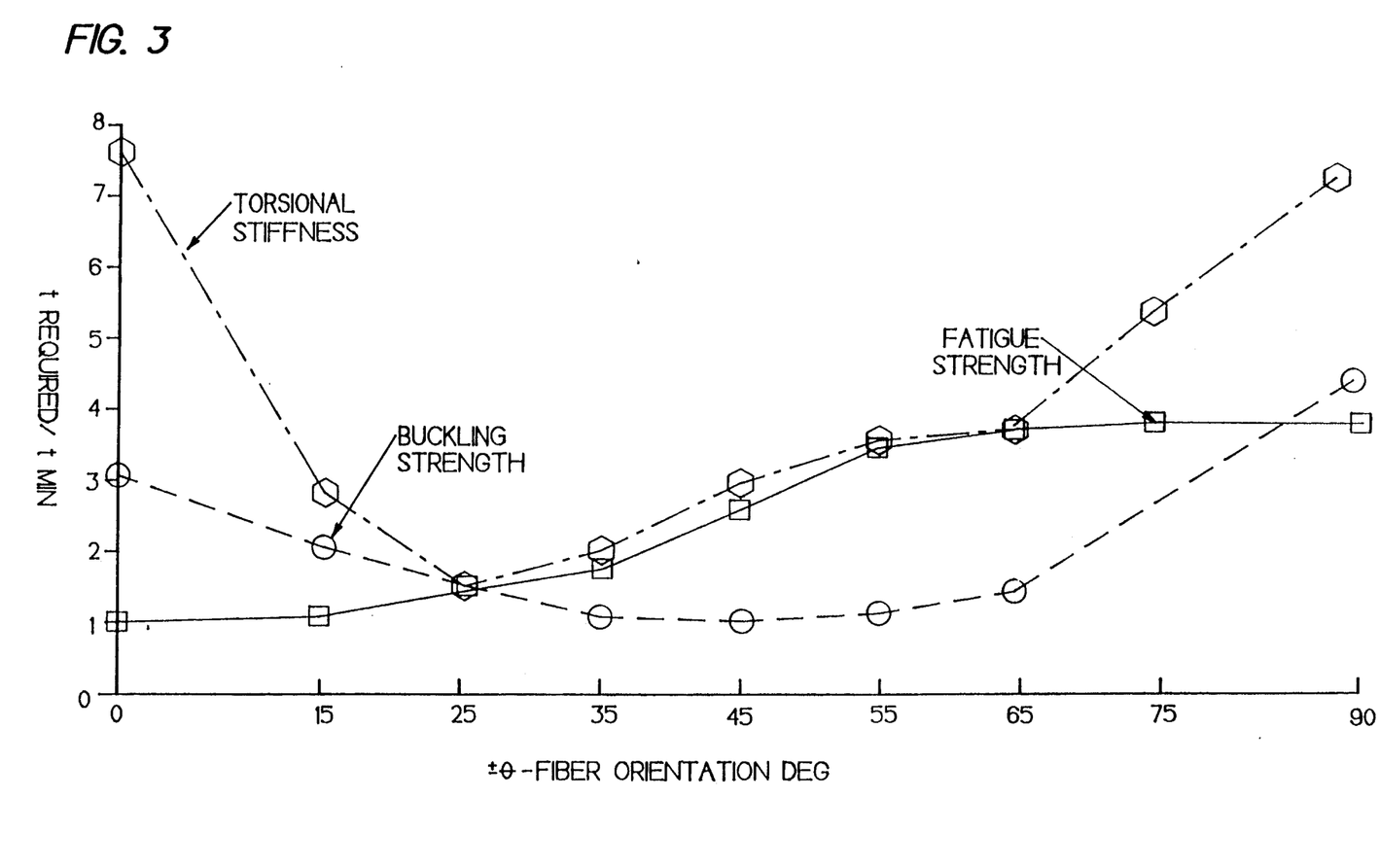
FIG. 3 is a graph depicting torsional stiffness, fatigue strength, and buckling strength design constraint curves for a torque tube in terms of torque tube wall thickness and fiber orientation.

The following formulae were utilized to generate torque tube wall thickness data points over the fiber orientation spectrum:

$$GJ = 4A^2 tG_{xy}/1 \approx tG_{xy} \quad (1)$$

$$Nx_{cr} \approx D_{11}D_{22} + D_{12} + 2D_{66} \quad (2)$$

$$\epsilon = 6M/E_x t^2 \approx 1/E_x t^2 \quad (3)$$

where A is the cross-sectional area of the torque tube at a given radial station (with respect to the axis of rotation 140), 1 is the length of the torque tube perimeter at the given radial station $D_{11}$ equals $E_x t^3/12(1-v_{yx2}{}^2 E_x/E_y)$, $D_{12}$ equals $v_{yx} D_{11}$, $D_{22}$ equals $E_y t^3/12(1-v_{yx} E_y/E_x)$, $D_{66}$ equals $G_{xy} t^3/6$, and M is the local fatigue moment in the laminate. The graphical results of the parametric analysis are illustrated in FIG. 3 which depicts the design constraint curves for torsional stiffness, fatigue strength, and buckling strength in terms of fiber orientation ($\pm \Theta°$ as shown in FIG. 2) and the required torque tube wall thickness to minimum torque tube wall thickness ratio ($t_{req}/t_{min}$) for the intermediate section of the torque tube.

To better understand the utility of this graph, the statement made hereinabove that prior art torque tubes having a $\pm 45°$ fiber orientation in the intermediate region are overdesigned will be examined in the context of FIG. 3. A line is extended vertically upward from the abscissa at the $\pm 45°$ fiber orientation mark to intersect the torsional stiffness, fatigue strength, and buckling strength curves. This vertical line intersects the buckling strength curve at about 1.0 (with respect to the ordinate), the fatigue strength curve at about 2.9, and the torsional stiffness curve at about 3.1. Based upon these results, the required wall thickness for the torque tube is dictated by the torsional stiffness design constraint that $t_{required}/t_{min}$ must equal about 3.1.

From the foregoing, however, it will be apparent that this required wall thickness is slightly greater than needed to satisfy the wall thickness required by the fatigue strength design constraint, and significantly greater (by about a factor of 3) than the wall thickness required by the buckling strength design constraint. Thus, even though a torque tube having an intermediate region with a $\pm 45°$ fiber orientation and a torque tube wall thickness based upon a ratio of 3.1 for $t_{req}/t_{min}$ satisfies all of the design constraints, i.e., will withstand the loads developed during startup and operation of the BMR assembly 100, such a torque tube configuration is not weight optimized since the required torque tube wall thickness is excessive for the fatigue and buckling strength design constraints.

To optimize the torque tube design for minimal unit weight (minimal required wall thickness), a fiber orientation should be selected where the sum of the $t_{req}/t_{min}$ ratios of the three design constraint curves is minimal.

An examination of FIG. 3 reveals that the ideal fiber orientation for the intermediate section 14 of the BMR torque tube 10, that is, one meeting the torsional stiffness, fatigue strength, and buckling strength design constraints at minimum unit weight (minimum required torque tube wall thickness), is about $\pm 26°$. The three design constraint curves intersect at this location such that each of the design constraint curves has a $t_{req}/t_{min}$ value of about 1.5, which results in a ratio sum of about 4.5 (compared to a ratio sum of about 7.0 for a torque tube having a $\pm 45°$ fiber orientation).

While the $\pm 26°$ fiber orientation is the "ideal" fiber orientation for providing minimum unit weight (minimum required wall thickness) for the torque tube while satisfying the torsional stiffness, fatigue strength, and buckling strength design constraints, other factors affect the selection of the fiber orientation (the "optimal" fiber orientation) for the intermediate section 14 of the BMR torque tube 10 according to the present invention.

As disclosed hereinabove, an inboard section 12, and in particular, the snubber subsection 18, that includes fibrous material having a $\pm 45°$ fiber orientation is advantageous for accommodating bearing loads arising from the snubber damper 152 and the pitch control rod 160 connections. In general, this would necessitate the lay-up of additional fibrous material having the $\pm 45°$ fiber orientation in the inboard section 12, with a concomitant increase in the overall weight of the torque tube.

Due to the spanwise cross-sectional shape distribution of the inboard section 12 of the BMR torque tube 10 illustrated in FIG. 2, i.e., the tapered configuration, and the inherent variability of the winding angles provided by current composite winding fabrication equipment, the fiber orientation angle of continuous fiber windings transitioning from the intermediate section to the inboard section is not constant. Current fiber winding techniques result in a fiber orientation angle in the inboard section that is greater than the fiber orientation angle in the intermediate section.

The inventors have determined that the effects of these two factors may be counterbalanced by selecting a fiber orientation for the intermediate section 14 that is greater than the ideal fiber orientation ($\Theta = \pm 26°$). More specifically, the inventors have determined that a fiber orientation of about $\pm 35°$ (the "optimal" fiber orientation) for the intermediate section 14 of the BMR torque tube 10 of the present invention counterbalances the factors described in the preceding paragraphs, as discussed in the following paragraph. In addition, the optimal $\pm 35°$ fiber orientation provides a significant savings in the overall weight of the BMR torque tube 10 as compared to prior art torque tubes having a $\pm 45°$ fiber orientation. Examining FIG. 3, the optimal $\pm 35°$ fiber orientation has a ratio sum of about 5.0 as compared to the 7.0 ratio sum for the $\pm 45°$ fiber orientation.

A continuous fiber winding having the optimal fiber orientation of about $\pm 35°$ in the intermediate section 14 can be smoothly transitioned utilizing current fiber winding techniques to provide a $\pm 45°$ fiber orientation in the snubber subsection 18 of the inboard section 12. Thus, the pragmatic effect of current fiber winding techniques is utilized to provide a beneficial fiber orientation in the inboard section 12 that enhances the overall structural strength of the snubber subsection 18 without necessitating the use of additional fibrous material having a $\pm 45°$ fiber orientation.

Based upon the foregoing disclosure, the following table provides a synopsis of the major fiber orientations of the BMR torque tube 10 according to the present invention:

TABLE

| Section/Subsection | Fiber Orientation |
| --- | --- |
| Snubber | $\pm 45°//90°$ |
| Transition | $\pm 45° \rightarrow \pm 35°$ |
| Intermediate | $\pm 35°$ |
| Blade Connection | $\pm 35°//0°/+//-45°$ |

The utilization of the ±35° optimal fiber orientation for the continuous filaments forming the intermediate section 14 results in a BMR torque tube 10 having a minimal torque tube wall thickness that satisfies the torsional stiffness, fatigue strength, and buckling strength design constraints of the BMR assembly 100 at minimal overall weight. While the weight savings resulting from the use of the ±35° optimal fiber orientation is somewhat less than that available from the ±26° ideal fiber orientation, each continuous filament winding having the ±35° optimal fiber orientation facilitates the formation of a layer of ±45° fiber orientation in the snubber subsection 18, which enhances the overall structural strength of the snubber subsection 18 of the BMR torque tube 10.

Based upon the efficiency of current fiber winding techniques and the tapered configuration of the BMR torque tube 10, the inventors have determined that the ±35° fiber orientation is optimal for forming the intermediate section 14, as described in the preceding paragraphs. It will be appreciated, however, based upon an examination of FIG. 3, that other fiber orientations within a range adjacent the ideal and/or optimal fiber orientations described hereinabove may be utilized to form the intermediate section. The utilization of such fiber orientations will still result in the formation of a BMR torque tube that has a lower overall weight than prior art torque tubes utilizing the ±45° fiber orientation. Therefore, it should be understood that a broad preferred range of fiber orientations for the intermediate section for the BMR torque tube may encompass the range from about ±18° (ratio sum of about 5.6) to about ±40°, and a narrower preferred range of fiber orientations may encompass the range from about ±26° (ratio sum of about 4.5) to about ±35° (ratio sum of about 5.0).

One lay-up protocol for forming the composite structure of the BMR torque tube 10 of the present invention is described in the following paragraphs. Those skilled in the art are generally familiar with composite fabrication techniques and the apparatus required by such techniques so that only a general overview of the lay-up protocol is described. A mandrel having the configuration of the BMR torque tube 10 is utilized for the composite lay-up process.

Figures 4A, 4B, 4C, 4D, 4E:
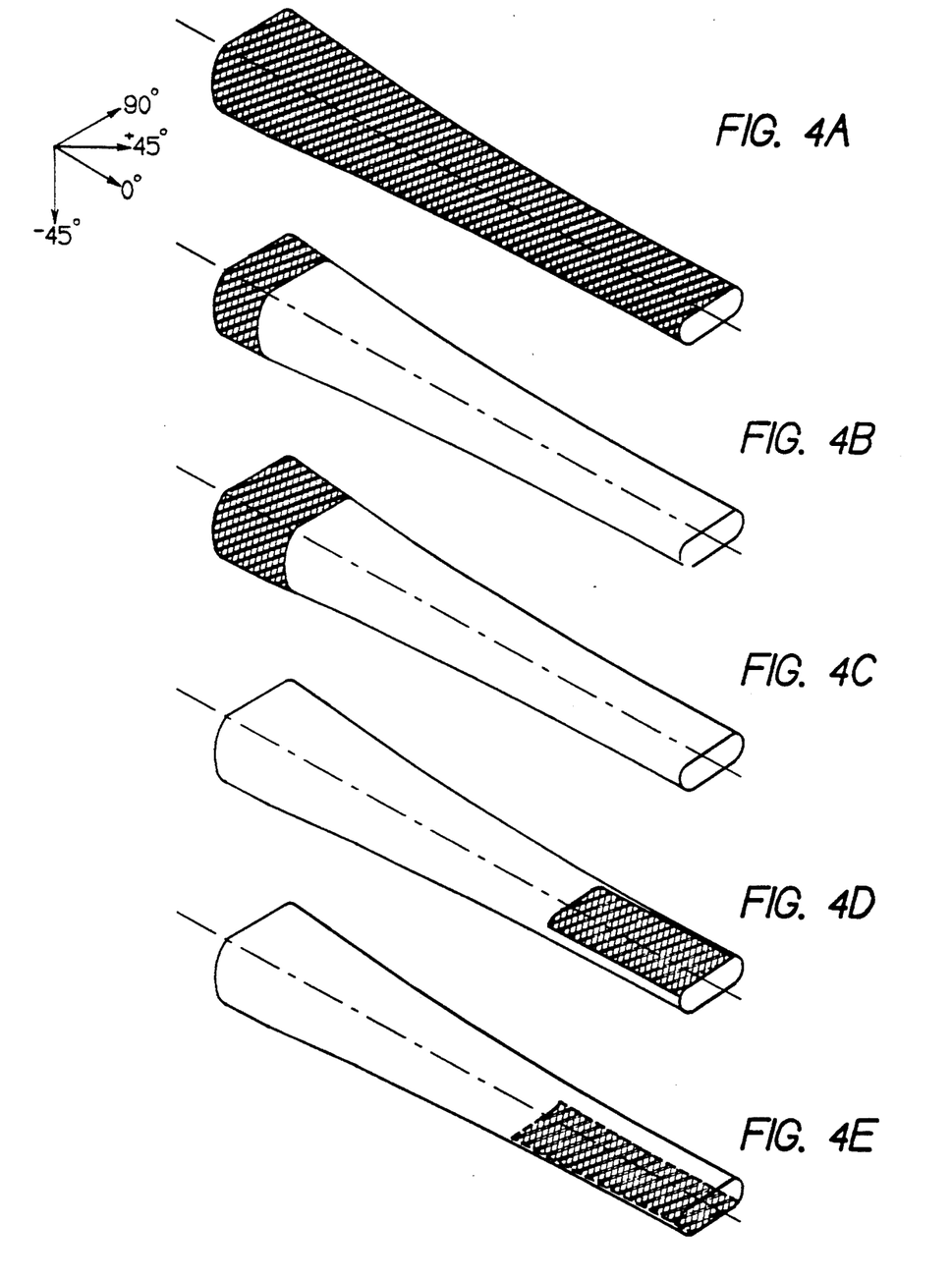
FIGS. 4A–4K are perspective views illustrating one lay-up protocol for fabricating a BMR torque tube according to the present invention.

As the first step of the fabrication protocol, continuous filaments are wound along the entire length of the mandrel as illustrated in FIG. 4A. These continuous filaments are tension wound to maintain the proper fiber orientations along the entire span length of the mandrel. The continuous filaments are wound to provide the constant ±35° optimal fiber orientation in the intermediate and outboard sections 14, 16, a constant ±45° fiber orientation in the snubber subsection 18, and a fiber orientation transitioning between ±35° and ±45° in the transition subsection 20.

Figures 4F, 4G, 4H, 4I, 4J, 4K:
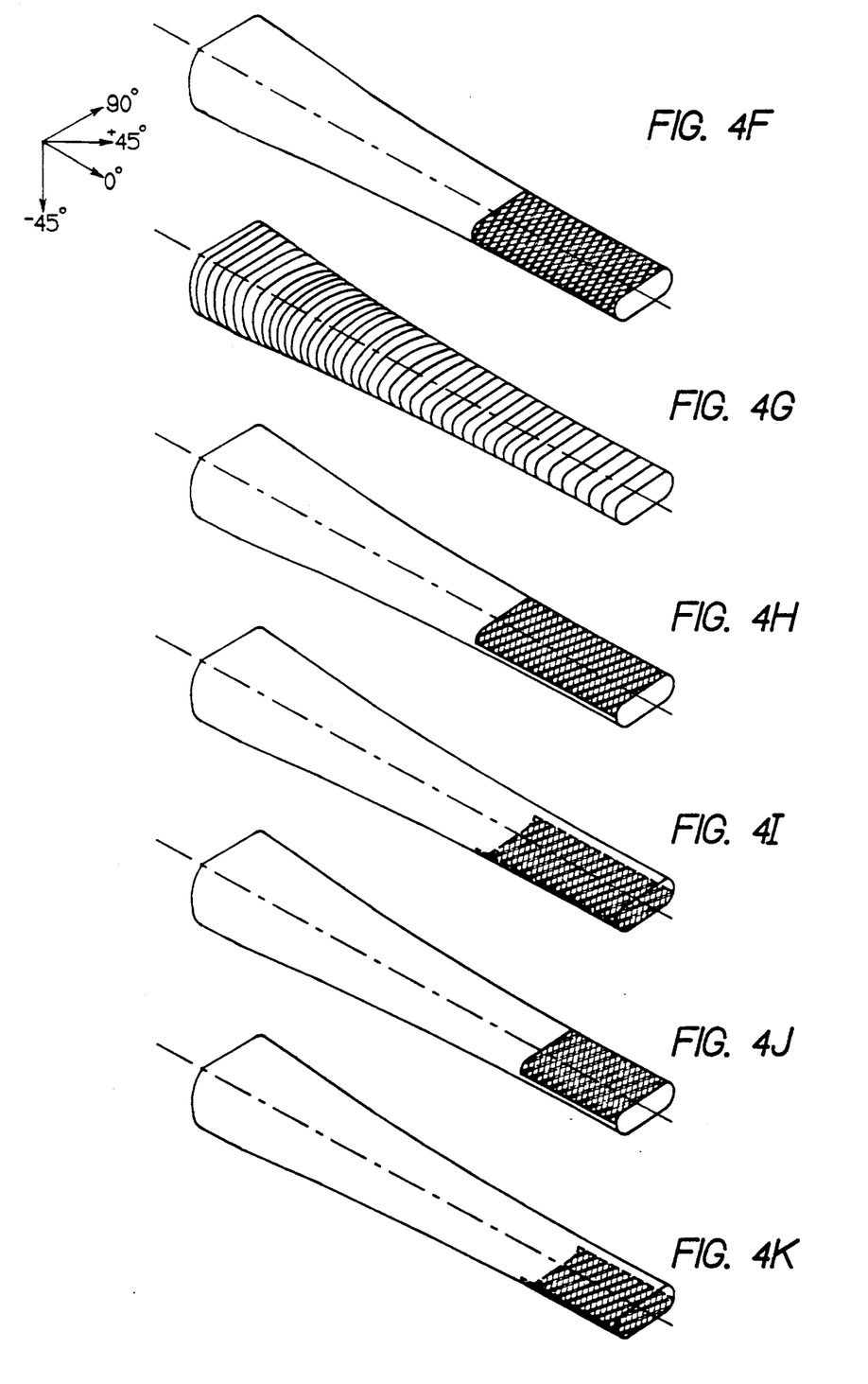

Next, filaments having a 90° fiber orientation are wound about the snubber subsection 18 as illustrated in FIG. 4B. Fibrous wraps having ±45° fiber orientations are then applied to the inboard section 12 as illustrated in FIG. 4C. Fibrous laminates having ±20° fiber orientations are next applied to the ventral and dorsal surfaces of the outboard section 16 as shown in FIGS. 4D, 4E. Fibrous wraps having ±45° fiber orientations are then applied to the outboard section 16 as illustrated in FIG. 4F. At this juncture in the lay-up protocol, the partially layed-up composite structure is nylon wrapped, covered with bleeder (epoxy resin), vacuum bagged, and debulked for about two hours as illustrated in FIG. 4G.

After debulking is completed, filaments having a 90° fiber orientation are wound about a portion of the inboard section 12 in a manner similar to that illustrated in FIG. 4B. Fibrous laminates having a 0° fiber orientation are then applied to the ventral and dorsal surfaces of the outboard section 16 as shown in FIGS. 4H, 4I. Next, fibrous wraps having ±45° fiber orientations and fibrous laminates having a 0° fiber orientation, respectively, are applied to the outboard section 16. This partially layed-up structure is wrapped, covered with bleeder, vacuum bagged, and debulked for about two hours.

The next lay-up sequence includes tension winding continuous filaments having the optimal fiber orientation along the entire length of the partially layed-up structure as described hereinabove, applying fibrous laminates having a 0° fiber orientation to the outboard section 16, applying fibrous wraps having ±45° fiber orientations to the outboard section 16, applying fibrous laminates having a 0° fiber orientation to the outboard section 16, applying fibrous wraps having ±45° fiber orientations to the inboard section 12, respectively, and then debulking for about one hour. The subsequent lay-up sequence includes tension winding of filaments having a 90° fiber orientation about the inboard section 12, applying fibrous wraps having ±45° fiber orientations to the inboard section 12, and debulking for about two hours.

Fibrous laminates having 0°, ±45° (see FIGS. 4J, 4K), and 0° fiber orientations, respectively, are then applied to the outboard section 16. Continuous filaments having the optimal fiber orientation are then tension wound along the entire length of the structure as described hereinabove, 90° filaments are wound about the inboard section 12, and debulking for one hour are then sequentially effected. The next sequence includes the application, respectively of 0° fibrous laminates, ±45° fibrous wraps, and 0° fibrous laminates to the outboard section 16, and the application of ±45° fibrous wraps and 90° filament windings to the inboard section 12.

After debulking for two hours, ±45° fibrous wraps and 0° fibrous laminates are applied to the outboard section 16. Finally, continuous filaments having the optimal fiber orientation are tension wound along the entire length of the structure as described hereinabove.

The foregoing lay-up protocol provides a BMR torque tube 10 which meets the torsional stiffness, fatigue strength, and buckling strength design constraints with minimal unit weight, i.e., minimal torque tube wall thickness over the intermediate section 14. Such a BMR torque tube 10 has torque tube wall thicknesses that differ for the various sections/subsections comprising the BMR torque tube 10. The torque tube wall thicknesses of the intermediate section 14 and the snubber subsection 18 have constant thicknesses of different magnitude, the blade connection subsection 24 has ventral and dorsal wall thicknesses of constant magnitude, and the inboard transition and outboard continuation subsections 20, 22 have varying torque tube wall thicknesses in the spanwise direction.

For example, one embodiment of the BMR torque tube 10 of the present invention fabricated according to the lay-up protocol described hereinabove, based upon torsional strength, fatigue strength, and buckling strength design constraints for the RAH-66 Comanche helicopter, has an intermediate section 14 with a constant torque tube wall thickness of about 0.1 inches. Each of the optimally orientated continuous filament windings comprising the intermediate section 14 provides a thickness of about 0.025 inches for each of the 5 winding sequences described hereinabove. The snubber subsection 18, with each of the applied fibrous windings and wraps providing a thickness of about 0.012 inches, has a constant torque tube wall thickness of about 0.316 inches, which includes the thickness provided by the optimally orientated continuous filament windings.

The blade connection subsection 24, with each of the applied fibrous wraps and laminates providing a thickness of about 0.012 inches, has a constant torque tube wall thickness for the ventral and dorsal surfaces of about 0.484 inches, which includes the thickness provided by the optimally orientated continuous filament windings. Due to the discontinuous nature of the applied fibrous laminates (see FIGS. 4D, 4E, 4H, 4I, 4J, 4K), the torque tube wall thickness of the edges of the blade connection subsection 24 are less than 0.484 inches.

The torque tube wall thicknesses of the inboard transition subsection 20 and the outboard continuation subsection 22, in contrast, are variable in the spanwise direction due to the variable sizings of the fibrous laminates/wraps applied during the lay-up protocol as described hereinabove.

Each BMR torque tube 10 has a respective pitch control rod 160 attached to the snubber subsection 18 as generally illustrated in FIG. 1. Techniques for attaching pitch control rods to a torque tube formed of composite material are generally known to those skilled in the art and may be utilized to rigidly secure a pitch control rod in combination with a corresponding torque tube according to the present invention.

A variety of modifications and variations of the present invention are possible in light of the above teachings. For example, the above-described lay-up protocol may be utilized with continuous filaments that are tension wound to form one or more of the fiber orientations within the broad and/or narrow fiber orientation ranges described hereinabove. It is therefore to be understood that, within the scope of the appended claims, the present invention may be practiced otherwise than as specifically described hereinabove.

What is claimed is:

1. A composite torque tube for a bearingless main rotor assembly that is optimally fabricated for minimal weight with respect to predetermined torsional stiffness, fatigue strength, and buckling strength design constraints of the bearingless main rotor assembly, comprising:

a hollow, elongated, tapered structural member formed from a combination of continuous filament windings, wound filaments, fibrous wraps, and fibrous laminates, said structural member including an inboard section configured for mechanically coupling said composite torque tube in combination with the bearingless main rotor assembly, said inboard section including a snubber subsection and an inboard transition subsection;

an outboard section, and an intermediate section continuous with said inboard and outboard sections and configured to accommodate pitch, flapwise, and edgewise loads acting on the bearingless main rotor assembly during operation thereof, said intermediate section being formed solely by said continuous filament windings, each of said continuous filament windings forming said intermediate section having a predetermined fiber orientation selected from a range of fiber orientations of about ±18° to about ±40° to provide a minimal, constant torque tube wall thickness for said intermediate section that accommodates the predetermined torsional stiffness, fatigue strength, and buckling strength design constraints of the bearingless main rotor assembly;

said inboard and outboard sections including each of said continuous filament windings forming said intermediate section, each of said continuous filament windings in said snubber subsection having a ±45° fiber orientation; and wherein each of said continuous filament windings forming said intermediate section transitions from said predetermined fiber orientation of said intermediate section to said ±45° fiber orientation of said snubber subsection over said inboard transition subsection.

2. The composite torque tube of claim 1 wherein said intermediate section is formed solely by said continuous filament windings, each of said continuous filament windings having said predetermined fiber orientation selected from a range of fiber orientations of about ±26° to about ±35° to provide said minimal, constant torque tube wall thickness for said intermediate section that accommodates the predetermined torsional stiffness, fatigue strength, and buckling strength design constraints of the bearingless main rotor assembly.

3. The composite torque tube of claim 1 wherein said intermediate section is formed solely by said continuous filament windings, each of said continuous filament windings having an optimal fiber orientation of about ±35° to provide said minimal, constant torque tube wall thickness for said intermediate section that accommodates the predetermined torsional stiffness, fatigue strength, and buckling strength design constraints of the bearingless main rotor assembly.

4. The composite torque tube of claim 3 wherein each of said continuous filament windings having said ±35° optimal fiber orientation transition to said ±45° fiber orientation in said snubber subsection of said inboard section over said inboard transition subsection.

5. The composite torque tube of claim 1 wherein said outboard section includes said fibrous laminates having a 0° fiber orientation to react mechanical coupling loads of the bearingless main rotor assembly.

6. The composite torque tube of claim 1 wherein said outboard section includes said fibrous laminates and fibrous wraps having a ±45° fiber orientation to accommodate load transfers in the bearingless main rotor assembly.

7. The composite torque tube of claim 1 wherein said inboard section includes said wound filaments having a 90° fiber orientation to accommodate hoop stresses in the bearingless main rotor assembly.

8. The composite torque tube of claim 1 wherein said inboard section includes said fibrous wraps having a ±45° fiber orientation to accommodate bearing loads in the bearingless main rotor assembly.

9. The composite torque tube of claim 1 wherein said inboard section has aligned snubber apertures formed in ventral and dorsal surfaces thereof.

* * * * *